United States Patent [19]

Mikata et al.

[11] Patent Number: 4,979,608
[45] Date of Patent: Dec. 25, 1990

[54] TWO TROUGH, ELECTROMAGNETICALLY VIBRATORY FEEDER

[75] Inventors: Yoshitaka Mikata; Tadashi Higuchi; Shogo Harada, all of Hyogo, Japan

[73] Assignee: Yamato Scale Company, Limited, Akashi, Japan

[21] Appl. No.: 270,700

[22] Filed: Nov. 14, 1988

[30] Foreign Application Priority Data

Jul. 4, 1988 [JP] Japan .................. 63-166250

[51] Int. Cl.$^5$ .................................. B65G 47/18
[52] U.S. Cl. .................... 198/566; 198/609; 198/758; 198/769
[58] Field of Search ............... 198/609, 758, 769, 566

[56] References Cited

U.S. PATENT DOCUMENTS

| | | | |
|---|---|---|---|
| 2,333,338 | 11/1943 | Rapp | 198/609 |
| 2,819,788 | 11/1958 | Howard | 198/609 |
| 3,476,234 | 11/1969 | Allen et al. | 198/609 |
| 3,786,912 | 1/1974 | Taylor | 198/220 |
| 4,378,064 | 3/1983 | Brown | 198/769 |

FOREIGN PATENT DOCUMENTS

| | | |
|---|---|---|
| 34-7442 | 5/1959 | Japan . |
| 44432 | 3/1980 | Japan .................. 198/609 |
| 58-1015 | 1/1983 | Japan . |
| 60-153335 | 8/1985 | Japan . |

Primary Examiner—Joseph E. Valenza
Attorney, Agent, or Firm—Senniger, Powers, Leavitt and Roedel

[57] ABSTRACT

A three mass, two trough feeder transfers articles on first and second troughs by vibrating the troughs. First and second leaf springs support the troughs on a base with the troughs in line with each other and with one trough overlapping the other. The ratio of the spring constant of the first leaf springs to the first trough mass equals the ratio of the spring constant of the second leaf spring to the second trough mass. An electromagnetic driver between one of the troughs and the base is excited with a signal having a frequency with an angular velocity equal to the square root of the ratio. A plurality of feeders may be positioned radially outwardly about the periphery of a conical head for distributing articles.

24 Claims, 4 Drawing Sheets

AT $f_I$

AT $f_{II}$

AT $f_{III}$

TWO TROUGH, ELECTROMAGNETICALLY VIBRATORY FEEDER

FIELD OF INVENTION

The present invention relates to a feeder for transferring articles on a substantially horizontal trough in one direction between two points in a production line, and, in particular, a feeder which electromagnetically vibrates the trough in a vertically inclined direction with respect to the feeding direction so that the articles intermittently jump. The articles may be mechanical parts of the same shape, or foods of various shapes before packaging, for example.

BACKGROUND OF THE INVENTION

A two mass feeder includes a base supported on a floor by mounting springs, a horizontal trough supported on the base by inclined leaf springs, and an electromagnetic vibrator or driver mounted between the base and trough to vibrate the trough. In this two mass (base and trough) vibratory system, a large reaction force acts on the base, which should accordingly have a large mass; but nevertheless, vibrations are transmitted to the floor through the mounting springs.

Taylor U.S. Pat. No. 3,786,912 shows a three mass feeder, which includes springs supporting an action mass having a trough and a reaction mass on a base mass. An electromagnetic driver is interposed between the action and reaction masses. The action and reaction masses have coincident centers of gravity, and more preferably, the effective lengths of the springs of the action and reaction masses are the same, in order to vibrate these masses in reverse Phase. This offsets or substantially reduces the vibration of the base mass, so that the base may be fixed to the floor. In this feeder, however, only a single track on the action mass is used to transfer articles.

Brown U.S. Pat. No. 4,378,064 shows another three mass electromagnetic feeder, which includes an electromagnet mounted, as one of the three masses, to a base by springs, and an armature fixed to the base. Horizontal vibratory force acts between the electromagnet and armature. A trough and the base vibrate in reverse phase, and the electromagnet and base vibrate in phase. This can reduce the gap between the electromagnet and armature, resulting in less electric power consumption. However, the vibration of the base is large, and only one trough is used to transfer articles.

Thus, in these prior art feeders, the vibration of only one trough or track as one of the three masses is effectively used to transfer articles, resulting in a low transfer capacity.

SUMMARY OF THE INVENTION

It is an object of this invention to provide a three mass, two trough electromagnetically vibratory feeder.

It is another object of the invention to provide such a feeder, which includes a first trough and a second trough arranged downstream from and associated with the first trough for smooth transfer of articles without interference between the troughs. Preferably, the first trough should decline steeply toward the second trough to initially loosen entangled articles, while the second trough should extend horizontally to continuously transfer a constant amount of the loosened articles.

It is another object of the invention to provide such a feeder, wherein the troughs are mounted on the base by springs, and which is operable in a particular mode of vibration, in which mode the troughs vibrate in reverse phase to each other. This reverse phase vibration of the troughs offsets the Pitching moment on the base to achieve smooth transfer of articles, which would otherwise be opposed by the vertical movement of the troughs due to the pitching of the base. In this particular mode of vibration, the base displacement is reduced, thereby increasing the driving energy and decreasing the necessity of reinforcing the mechanical Parts.

It is another object of the invention to provide such a feeder tuned to inhibit modes of vibration other than the mode in which the troughs vibrate in reverse phase.

It is another object of the invention to provide such a feeder, which includes upstream and downstream troughs in-line with each other and spaced radially outwardly from a central distribution point to transfer articles to, for example, the weigh hoppers of a combination weighting machine.

It is an object of this invention to provide a two trough feeder transferring articles in two successive steps, in which both the upstream and downstream troughs may extend horizontally for a long distance of transfer, or in which the downstream trough is horizontal and the upstream trough declines toward the downstream trough, so the entangled articles are loosened and transferred smoothly and stably.

It is another object of this invention to provide a two trough feeder in which both troughs vibrate in reverse phase, and their pitching motions around the center of gravity of the base offset each other. Thus, no pitching motion of the base affects the motions of the troughs so that articles on the trough will jump and proceed smoothly over a long distance of transfer.

It is yet another object of this invention to provide a two trough feeder in which the electromagnetic driver, the springs and other dynamic parts are under the troughs so that the dynamic parts can be covered by a housing without interference.

It is another object of this invention to provide a two trough feeder in which the base mass is small so that the apparatus is lightweight.

An electromagnetically vibratory feeder according to this invention includes a base and means resiliently mounting the base on a support. A first trough and a second trough are suPported by first and second resilient means on the base in line with each other and with one trough overlapping the other. Electromagnetic driver means induces relative vibration between the base and one of the troughs. In one embodiment, the ratio of the spring constant of the first resilient means to the first trough mass equals the ratio of the spring constant of the second resilient means to the second trough mass, the driver means being adapted to be excited with a signal having a frequencY with an angular velocity equal to the square root of either of the ratios.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF PREFERRED EMBODIMENTS

Figure 1:
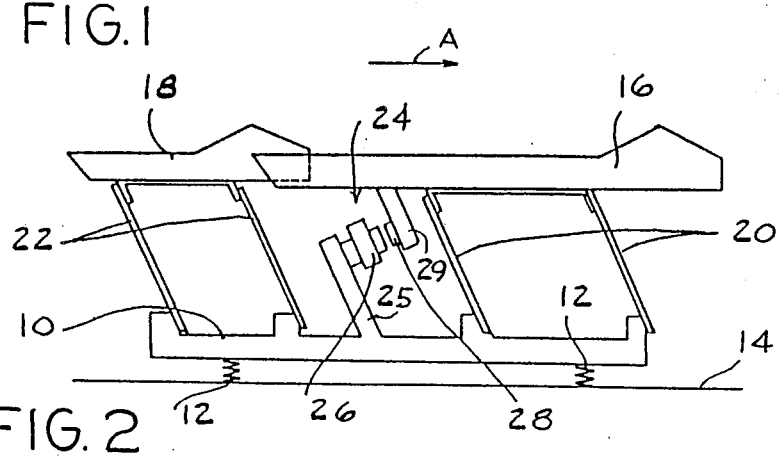
FIG. 1 is a side view of a feeder according to one preferred embodiment of the invention.

With reference to FIG. 1, the feeder includes a base 10 mounted resiliently by springs 12 to a floor 14. A channel-shaped member or a long, relatively narrow, generally shallow receptacle such as a first (rear; auxiliary; upstream) trough 18 and a similar second (front; main; downstream) trough 16 are substantially horizontally supported by a Pair of first leaf springs 22 and a pair of second leaf springs 20, extending upwardly and rearwardly (upstream) from base 10. First springs 22 and second springs 20 constitute first and second resilient means for supporting the first and second troughs 18,16 in line with each other on the base and with first trough 18 overlapping second trough 16. Means, not shown, are provided for supplying articles onto the first trough 18.

The troughs 16 and 18 are each substantially planar and extend horizontally in the direction of the transfer of the articles on the feeder as indicated by arrow A so that articles are transferred from first or upstream trough 18 to the second or downstream trough 16. Upstream trou9h 18 is Positioned slightly higher than downstream trough 16 so that the troughs are located in parallel planes. A downstream end portion of upstream trough 18 overlays an upstream end portion of downstream trough 16 and is movable relative to it, forming a continuous passage for articles along the troughs.

An electromagnetic driver 24 includes a coil 26 secured to support 25 on base 10, and an armature 28 secured to support 29 on the downstream trough 16. Driver 24 constitutes an electromagnetic driver means connected to and located between downstream trough 16 and base 10. The coil 26 is energized with half-wave rectified alternating current at a commercial frequency to reduce relative vibration between the base and the downstream trough.

Figure 2:
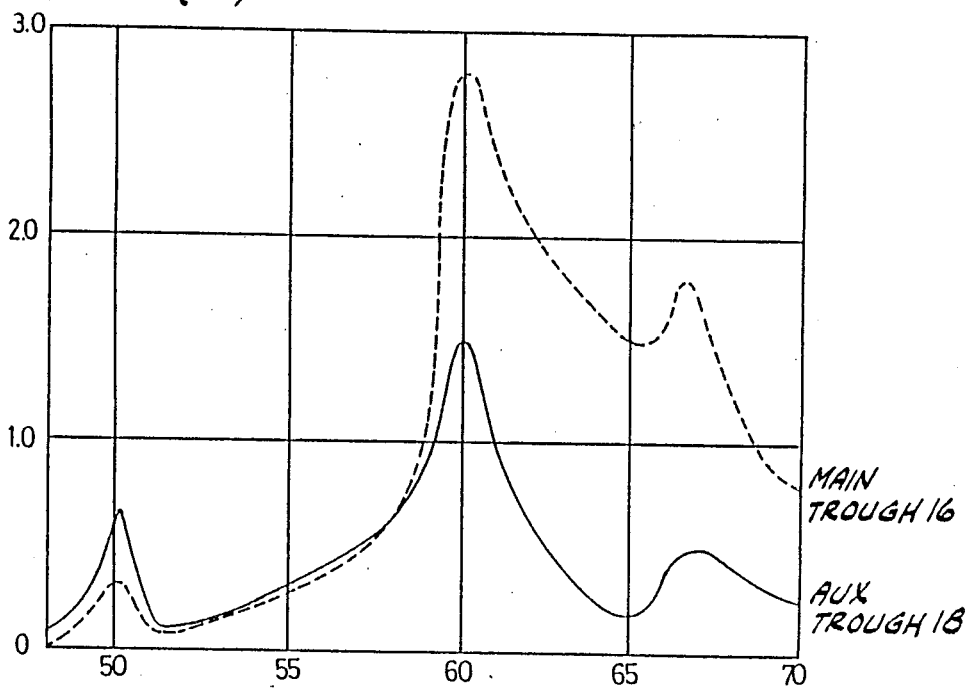
FIG. 2 is a graph showing the vibratory characteristics of the feeder of FIG. 1.

FIG. 2 shows the vibratory characteristics of a feeder according to the FIG. 1 embodiment. The abscissa represents the vibratory frequencies of downstream (main) trough 16 and upstream (auxiliary) trough 18, and the ordinate represents their amplitudes of vibration. As shown in FIG. 2, amplitude peaks, i.e., resonances, occur at three frequencies fI = 50.3 Hz, fII = 60 Hz and fIII = 66.4 Hz.

Figure 3A:
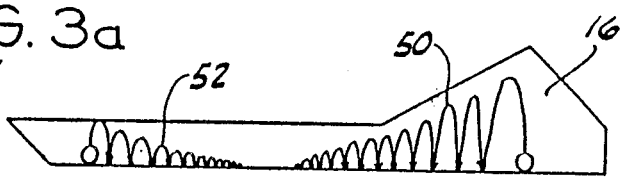
FIGS. 3(a)–3(c) are diagrams showing the resulting movements of articles on the second trough of the feeder of FIG. 1 at frequencies of vibration fI, fII and fIII, respectively, of the second trough as illustrated in FIG. 2.
Figure 3B:
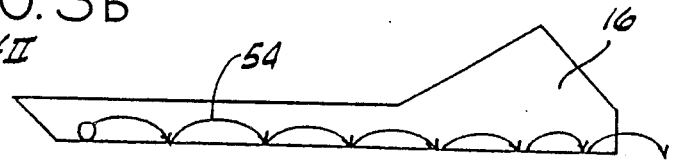
Figure 3C:
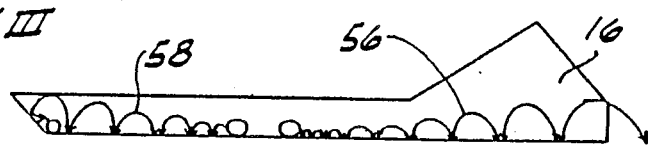

The amplitude was maximum at 60 Hz. FIGS. 3(a)-3(c) show the movement of articles on the downstream (main) trough 16 at fI-fIII, respectively. Similar movement of articles would occur on the upstream (auxiliary) trough.

In FIG. 3(a), an article placed on a downstream (right) portion of trough 16 did not move forwardly, but instead violently jumped while moving gradually upstream. This movement is indicated by arrows 50. As the article approached the center of trough 16, the article only slightly jumped and substantially stopped moving. On the other hand, after an article was placed on the upstream portion of trough 16, the article jumped while moving slowly downstream. This movement is indicated by arrows 52. As the article approached the center of trough 16, the article substantially stopped moving. This motion of the article is due to the combination of the feeding motion of trough 16 and the pitching motion of base 10.

In FIG. 3(b), an article placed anywhere on the trough 16 moved quickly, uniformly forwardly at a constant pitch while slightly jumping. This movement is indicated by arrows 54.

In FIG. 3(c), an article placed on a downstream portion of trough 16 jumped slightly while moving forward quickly with increasing vibrational amplitude. This movement is indicated by arrows 56. By contrast, after an article was placed on a upstream portion of trough 16, the article moved upstream. This movement is indicated by arrows 58. On the other hand, after an article was Placed around the center of trough 16, the article did not vibrate substantially or move substantially in either direction.

Figure 4A:
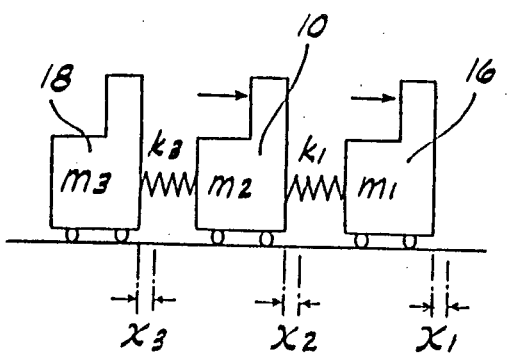
FIG. 4(a) is a diagram showing the vibration system of the feeder of the invention as a three mass, two spring horizontal free vibration system.

FIG. 4(a) diagrammatically shows the vibration system of the feeder of FIG. 1 as a free vibration system in one direction within a horizontal Plane. In FIG. 4(a), m1, m2, m3 and x1, x2, x3 represent the masses and displacements of trough 16, base 10 and trough 18, respectively, and k1 and k3 represent the spring constants of leaf springs 20 and 22, respectively.

Figure 4B:
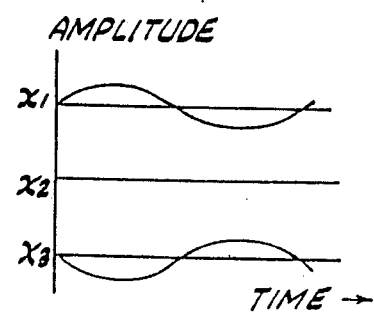
FIG. 4(b) is a graph showing one vibration mode of the system of FIG. 4(a)

FIG. 4(i b) graphically illustrates the mode of vibration at the frequency fII, wherein the vibratory displacements of this horizontal vibration system vary in amplitude with time. As shown in FIG. 4(b), after stabilization, troughs 16 and 18 vibrate in reverse phase, and the base 10 does not substantially vibrate. The amplitudes of vibration of the troughs are inversely proportional to the ratio of their masses.

From the analysis of the horizontal vibration system illustrated in FIG. 4(a) and the resonances indicated in FIG. 2, it has been determined that the primary resonance at a frequency f (with an angular velocity w;), in a system in which the troughs vibrate in reverse phase as shown in FIG. 4(b), occurs under the following condition:

$$\omega = 2\pi f = \sqrt{\frac{k1}{m1}} = \sqrt{\frac{k3}{m3}}.$$

This condition is also applicable if the driver 24 is provided between the upstream trough 18 and base 10. However, it is preferable to provide the driver 24 between the downstream trough 16 and base 10 because of the inclination of leaf springs 20 and 22.

In one aspect of this invention, the three mass vibration system of the feeder is adapted to operate in this condition to provide a resonant vibration mode suitable for feeding articles. This mode is achieved by making the ratio of k1 to m1 equal the ratio of k3 to m3, and energizing the coil 26 with half-wave rectified alternating current at the angular velocity W equaling the square root of this ratio.

In this resonant vibration mode, it has been found that the spring constants k1 and k3 can be small to lower the resonant frequency by 1-2 Hz, and, yet, maintain a stable, large amplitude of vibration. The moments acting on the base 10 by the vibrations of troughs 16 and 18 substantially offset each other, producing little or no pitching motion of the base, so that the feeding motion is not affected. These characteristics increase the feeding efficiency of this feeder.

By contrast, in the vibration mode at the lower resonance frequency fI, all the masses of base 10 and troughs 16 and 18 vibrate in phase, and the base pitches by the moment of rotation around its center of gravity. In the vibration mode at the higher frequency fIII, the troughs vibrate in phase, and the base vibrates in reverse phase thereto with a pitching motion. In these modes, as illustrated in FIGS. 3(a) and 3(c), the feeding is not as smooth as in the fIII mode.

Figure 5:
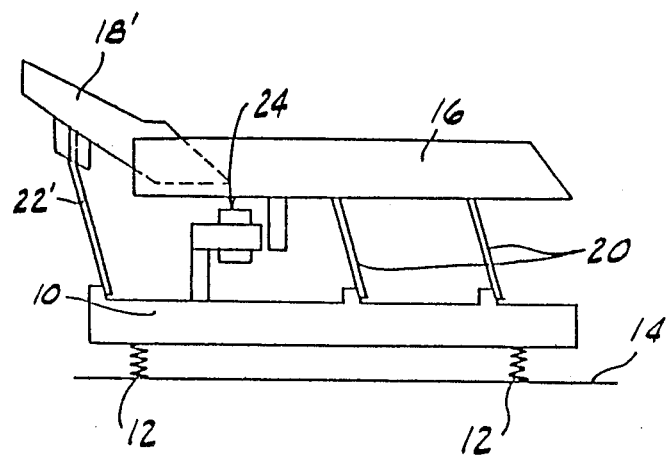
FIG. 5 is a side view of a feeder according to another preferred embodiment of the invention.

FIG. 5 shows a feeder according to another embodiment of this invention. This feeder includes a upstream trough 18' declining downwardly and forwardly toward downstream trough 16 so that a downstream end portion of upstream trough 18' overlays a upstream end portion of downstream trough 16. The sharp slope of this upstream trough 18', in combination with the large amplitude of vibration induced by driver 24, loosens entangled articles initially supplied thereto. This enables articles to be conveyed at a substantially constant rate and smoothly onto downstream trough 16. The portion of trough 18' overlaying trough 16 may be provided with an end substantially parallel to trough 16.

The upstream trough 18' is supported by a single leaf spring 22' to simplify the structure. This does not substantially influence the vibration mode and the feeding operation, particularly if the trough 18' is short in length.

Figure 8:
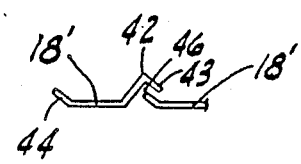
FIG. 8 is a partial view taken along line 8—8 of FIG. 6.
Figure 6:
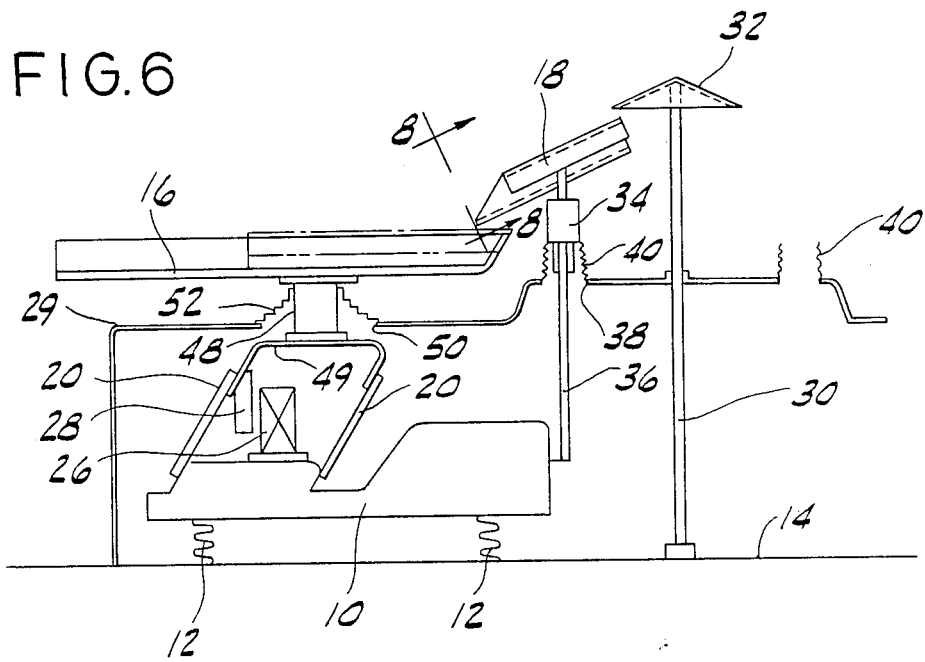
FIG. 6 is a side view of a feeder according to another preferred embodiment of the invention for a combination weigher.
Figure 7:
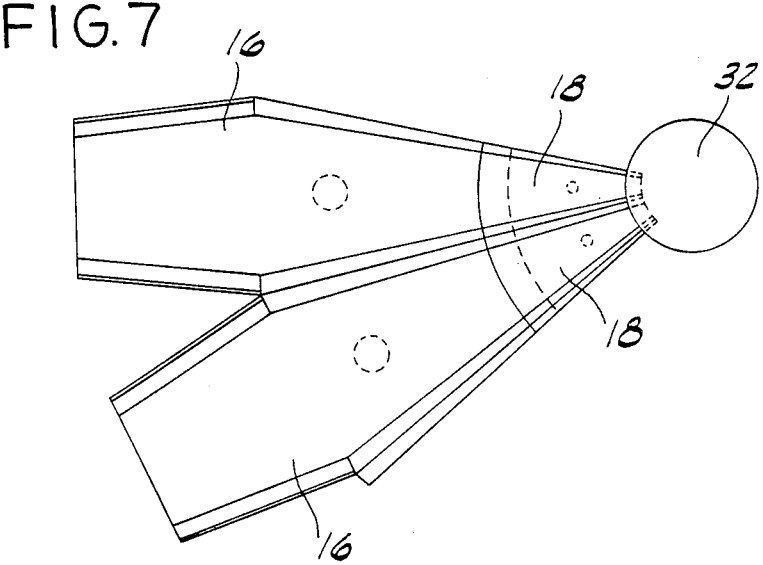
FIG. 7 is a partial top plan of the feeder shown in FIG. 6.

FIGS. 6-8 show another embodiment of the invention for use as a distributor having radially arranged feeders in conjunction with a combination weigher. FIG. 6 shows one of a plurality of radial feeders located about the periphery of conical head 32. The distributor includes a circular housing 29 fixed to floor 14. A pole 30 stands on the floor 14 and extends through the center of housing 29. The pole 30 has a conical head 32 on its top, onto which articles are supplied at its apex to slide radially outwardly on the head. Head 32 constitutes means for distributing the articles.

The head 32 is surrounded by a plurality of upstream (auxiliary) troughs 18', each extending radially and declining in the same manner as shown in FIG. 5. The upstream (inner) end of each trough 18' is positioned under and within the periphery of conical head 32. Thus, the troughs 18' form a generally frusto-conical surface around and underlaying head 32.

Each trough 18' is rigidly secured to a counterweight or anti-pitch weight 34 mounted outside the housing 29 by a leaf spring 36 on base 10. Each base 10 is resiliently mounted inside the housing by springs 12 on the floor 14. Therefore, a plurality of bases are peripherally arranged around head 32, each base having a upstream end adjacent head 32 and a downstream end located radially outwardly from the upstream end. The leaf spring 36 extends freely through a hole 38 in the housing 29. The hole 38 is sealed with a bellows 40 extending between the housing 29 and weight 34 to prevent liquid or dust from entering housing 29.

As shown in FIG. 8, each upstream trough 18' has upwardly inclining radial edge portions 42 and 44 on both sides. One edge portion 42 of each trough 18' terminates in a flanqe 43 which extends downwardly over the opposite edge portion 44 of an adjacent trough 18' with a gap 46 therebetween. This overlapping arrangement enables the troughs 18' to vibrate and transfer articles independently from each other, and prevents articles such as particles from entering the gap 46.

The downstream (main) trough 16 is substantially the same as illustrated in FIG. 5 and is aligned radially with its corresPonding uPstream (auxiliary) trough 18' located on the same base 10. Downstream trough 16 is horizontally supported outside housing 29 by a support 48, such as a rigid member, and leaf springs 20 on the base 10. The support 48 extends loosely through a hole 50 in the housing 29 and is rigidly connected to base 47 of rigid, inverted, u-shaped member 49. Member 49 has a pair of downwardly extending legs joined by base 47, each leg connected to one of the leaf springs 20 so that member 49 is located between springs 20 and trough 16. The hole 50 is sealed with a bellows 52.

An electromagnetic coil 26 is supported on and rigidly connected to base 10. U-shaped member 49 is provided with a downwardly projecting armature 28 magnetically coupled to coil 26. The coil 26 of each feeder is excited for independent vibration from the other feeders.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electromagnetically vibratory feeder for feeding articles comprising:
   a base;
   means resiliently mounting the base on a support;
   a first trough;
   a second trough;
   first and second resilient means for supporting said first and second troughs in line with each other on said base with one trough overlapping the other, the ratio of the spring constant of said first resilient means to the mass of the first trough being substantially equal to the ratio of the spring constant of said second resilient means to the mass of the second trough; and
   electromagnetic driver means for vibrating one of said troughs relative to said base, said driver means being adapted to be excited with a signal having a frequency with an angular velocity substantially equal to the square root of either of said ratio.

2. The feeder of claim 1 wherein said driver means vibrates the second trough.

3. The feeder of claim 1, wherein said first and second troughs are supported in substantially horizontal position by said first and second resilient means, respectively, and said first trough is positioned slightly higher than said second trough, and partially overlays an upstream portion of said second trough.

4. The feeder of claim 1, wherein said second trough is supported in substantially horizontal position by said second resilient means, and an upstream portion of said first trough is supported higher than a downstream portion thereof by said first resilient means so that said first trough declines toward said second trough, the downstream portion of said first trough partially overlaying an upstream portion of said second trough.

5. The feeder of claim 4 wherein said first resilient means comprises a leaf spring supporting said first trough, and said second resilient means comprises a pair of leaf springs supporting the second trough, said electromagnetic driver means provided between said second trough and said base.

6. The feeder of claim 1 wherein said first and second resilient means each comprises a pair of leaf springs supporting the first and second troughs, respectively.

7. The feeder of claim 1 further comprising means for distributing the articles from a central point to the first trough.

8. The feeder of claim 8 wherein said driver means vibrates the second trough.

9. The feeder of claim 7, wherein said first and second troughs are supported in substantially horizontal position by said first and second resilient means, respectively, and said first trough is positioned slightly higher than said second trough, and partially overlays an upstream portion of said second trough.

10. The feeder of claim 7, wherein said second trough is supported in substantially horizontal position by said second resilient means, and an upstream portion of said first trough is supported higher than a downstream portion thereof by said first resilient means so that said first trough declines toward said second trough, the downstream portion of said first trough partially overlaying an upstream portion of said second trough.

11. The feeder of claim 10 wherein said first resilient means comprises a single leaf spring supporting said first trough, and said second resilient means comprises a pair of leaf springs supporting the second trough, said electromagnetic driver means provided between said second trough and said base.

12. The feeder of claim 7, wherein said first and second resilient means each comprises a pair of leaf springs supporting the first and second troughs, respectively.

13. The feeder of claim 7 wherein said means for distributing comprises a conical head.

14. The feeder of claim 7 further comprising a housing adapted to cover said bases and located between said bases and said troughs, said first and second resilient means extending through openings in said housing.

15. The feeder of claim 7, wherein each first trough has upwardly inclining side edges, one side edge of said first trough terminating in a downwardly extending flange for overlaying a side edge of a trough radially adjacent thereto.

16. The feeder of claim 1 wherein said electromagnetic driver means comprise a single electromagnetic driver between said second trough and said base so that said first trough is driven only by vibrations transmitted by said base via the single leaf spring to said first trough and wherein no electromagnetic driver means is provided between said first trough and said base.

17. The feeder of claim 16, wherein said second trough is supported in substantially horizontal position by said second resilient means, and an upstream portion of said first trough is supported higher than a downstream portion thereof by said first resilient means so that said first trough declines toward said second trough, the downstream portion of said first trough partially overlaying an upstream portion of said second trough.

18. The feeder of claim 17 wherein said first resilient means comprises a single leaf spring supporting said first trough, and said second resilient means comprises a pair of leaf springs supporting the second trough, said electromagnetic driver provided between said second trough and said base.

19. The feeder of claim 16 wherein said first resilient means comprises a single leaf spring supporting said first trough, and said second resilient means comprises a pair of leaf springs supporting the second trough, said electromagnetic driver means provided between said second trough and said base.

20. The feeder of claim 16 further comprising a housing adapted to cover said bases and located between said bases and said troughs, said first and second resilient means extending through openings in said housing.

21. The feeder of claim 16 wherein each first trough has upwardly inclining side edges, one side edge of each said first trough terminating in a downwardly extending flange overlaying the side edge of the first trough radially adjacent thereto.

22. The feeder of claim 16 further comprising means for distributing the articles from a central point to the first trough.

23. The feeder of claim 1 further comprising means for distributing the articles from a central point to the first trough and wherein said electromagnetic driver means comprises a single electromagnetic driver between said second trough and said base so that said first trough is driven only by vibrations transmitted by said base via the single leaf spring to said first trough and wherein no electromagnetic driver means is provided between said first trough and said base.

24. An electromagnetically vibratory feeder apparatus for feeding articles comprising:
a base;
means resiliently mounting the base on a support;
a first trough;
a second trough;
first and second resilient means for supporting said first and second troughs in line with each other on said base with said first trough overlapping said second trough; and
a single electromagnetic driver for vibrating one of said troughs relative to said base wherein the other of said troughs is driven only by vibrations transmitted by said base via its respective resilient means and wherein no electromagnetic driver means is provided between said other of said troughs and said base, wherein the ratio of the spring constant of said first resilient means to the mass of the first trough substantially equals the ratio of the spring constant of said second resilient means to the mass of the second trough, and wherein said driver means is adapted to be excited with a signal having a frequency with an angular velocity substantially equal to the square root of either of said ratio.

* * * * *